Aug. 4, 1942.
S. BAGNO ET AL
Re. 22,150
CATHODE RAY OSCILLOSCOPE
Original Filed Jan. 17, 1935
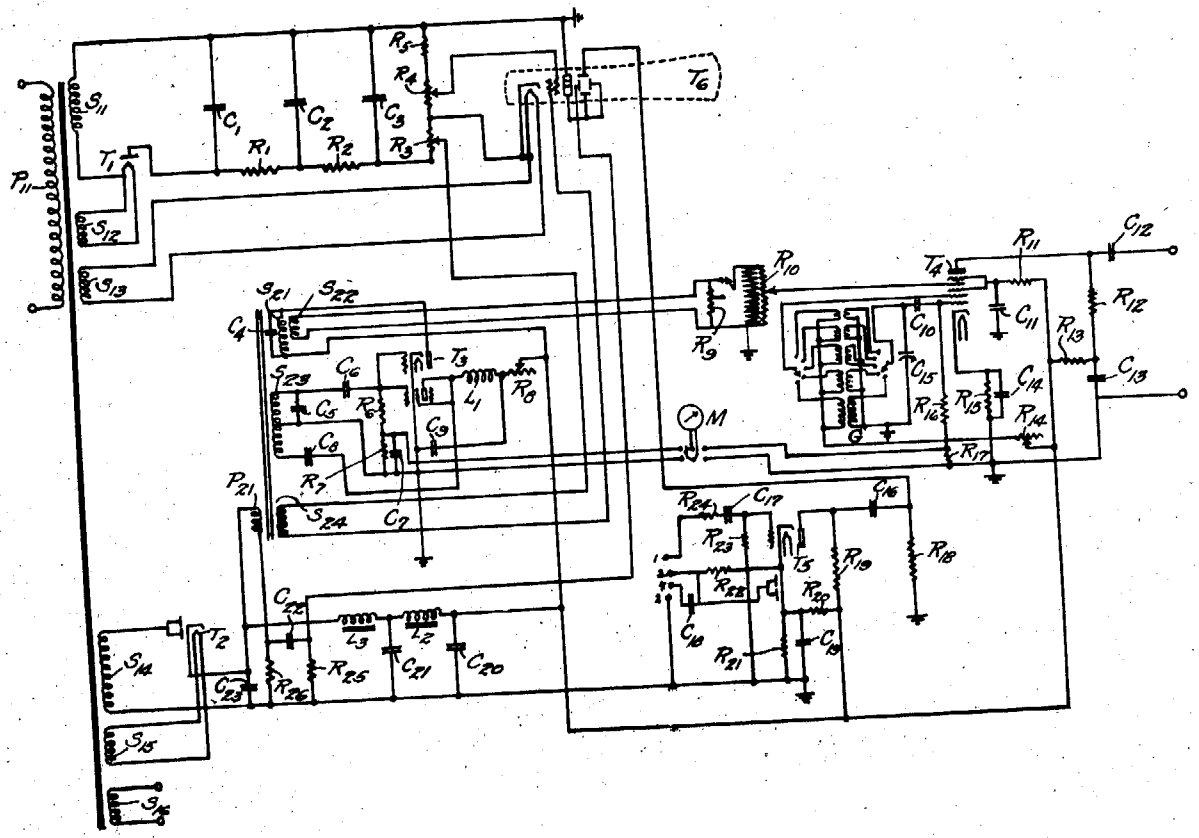
INVENTOR
BY Samuel Bagno
Martin Posner
ATTORNEY Reissued Aug. 4, 1942 Re. 22,150

UNITED STATES PATENT OFFICE 22,150

CATHODE RAY OSCILLOSCOPE

Samuel Bagno and Martin Posner, New York, N. Y., assignors to Radio Corporation of America, New York, N. Y., a corporation of Delaware Original No. 2,151,313, dated March 21, 1939, Serial No. 2,310, January 17, 1935. Application for reissue March 19, 1941, Serial No. 384,050

29 Claims. (Cl. 175—183)

This invention relates to frequency modulation circuits, more particularly to method and means for obtaining the frequency response curve of a circuit, and more especially to a new and improved method of cathode ray oscilloscopy.

One object of the invention is to provide a cathode ray oscilloscope which by its combination of sub-circuits permits rapid and accurate determination of the wave-form distortion characteristics of various apparatus used in the communications art.

Another object of the invention is to provide a cathode ray oscilloscope which will enable rapid and proper adjustment or alignment of intermediate and radio frequency amplifiers and other parts during the manufacture of such apparatus or in their subsequent servicing.

Another object of the invention is to provide a cathode ray oscilloscope which will combine all the elements necessary for its operation in one compact unit.

Another object of the invention is to provide a cathode ray oscilloscope of such wide frequency range and versatility as to permit its use as a general test instrument.

Another object is to maintain the test frequency band at constant width despite changes in the location of the band in the complete frequency spectrum.

Another object is to stabilize the frequency modulated oscillator of the apparatus against changes in tube parameters, and over the entire frequency band.

Another object is to eliminate mechanically moving parts, such as electric motors or the like, and to instead make the equipment wholly electrical, inexpensive, and dependable.

Another object is to make the apparatus operable in direct response to ordinary A. C. power lines; to use the power line A. C. as a constant frequency source for modulation; and to use a modulation wave not only for modulation, but also for "sweep" and for "occulting", whereby all of the operations are kept in perfect synchronism.

Another object is to so relate the modulating wave and the sweep wave that the frequency response curve plotted by the apparatus may be read correctly on a single scale, without distortion, despite changes in power line voltage.

Other objects and advantages will appear from the ensuing description taken in conjunction with the accompanying drawing.

Referring to the drawing, a power transformer is provided having a primary $P_{11}$ and secondaries $S_{11}$, $S_{12}$, $S_{13}$, $S_{14}$, $S_{15}$, $S_{16}$. The primary $P_{11}$ is connected to the standard voltage (usually 115) alternating current power line. The secondary $S_{11}$, in combination with the rectifier valve $T_1$ and network with condensers $C_1$—$C_2$—$C_3$ and resistors $R_1$—$R_2$ supplies a high voltage direct current to the bleeder-regulator and voltage divider $R_3$—$R_4$—$R_5$. The secondaries $S_{12}$ and $S_{13}$ supply the filament heating current required by the rectifier valve $T_1$ and cathode ray tube $T_6$ respectively. Thru an adjustable contactor on $R_4$ connected to the second grid of $T_6$. the electron stream emitted by the cathode of said tube on the way to the anode is both accelerated by the intermediate positive potential and concentrated into a fine beam.

The combination of the secondary $S_{14}$ and rectifier valve $T_2$ (type "84" say) establish a potential across the condenser $C_{23}$, and permit a current proportional to said voltage to flow thru the primary $P_{21}$ and resistor $R_{26}$. The potential across $R_{26}$ will then be proportional to the current flowing thru $P_{21}$. By making the resistance of $R_{25}$ sufficiently high, and introducing the blocking condenser $C_{22}$, the A. C. component across $R_{26}$ is picked up without phase alteration and fed to the horizontal plates of the cathode ray tube $T_6$, effecting a linear sweep.

In other words, condenser $C_{23}$ with associated load resistor $R_{26}$ function to generate a modulating wave, preferably an approximate "saw tooth" wave, in this case at the power line frequency, say 60 cycles. This saw tooth wave is applied to the horizontal deflectors of the cathode ray tube $T_6$, to produce sweep, or more broadly, physical motion in a horizontal direction. As will later appear, the preferably saw tooth wave is also used for frequency modulation, and for "occulting" the ray during its return sweep. Using the same wave for sweep and for modulation has the advantage that the curve may be read to scale despite changes in power line voltage.

The valve $T_3$, (type "6F7" say), in combination with secondaries $S_{21}$—$S_{22}$—$S_{23}$ and condensers $C_4$—$C_5$—$C_6$—$C_7$—$C_8$—$C_9$ and inductance $L_1$ and resistors $R_6$—$R_7$—$R_8$, serves as both oscillator (600 kilocycles say) and radio-frequency buffer stage. With the current flowing thru the primary $P_{21}$ of sufficiently high value, the saturation characteristics of the iron core are periodically varied. The tuned section of the oscillator thus alters in stipulated amount and assumes frequency modulated characteristics.

In other words the oscillator $T_3$ is a frequency modulated oscillator, the frequency of which is varied by the saw tooth modulating wave. The frequency is determined primarily by $S_{23}$ and $C_5$. An iron core is associated with inductance $S_{23}$. The modulating wave is applied to the iron core through coil $P_{21}$, and varies the saturation of the iron core, thereby varying the effective inductance of the coil $S_{23}$ and so varying the frequency of the oscillator.

This signal is inductively picked up by the coil $S_{22}$, and passed on in desired amount via the voltage divider $R_9$ and potentiometer $R_{10}$.

In other words, frequency modulated output of oscillator $T_3$ is controlled or attenuated to the desired amount, this being done in the present case by a suitable attenuator indicated at $R_9$, $R_{10}$. This control or attenuation preferably takes place as shown, that is, ahead of the generation of the final test signal, that is, ahead of oscillator $T_4$.

The value $T_4$, (type "6A7" say), in combination with the tuned coupling inductances G and condensers $C_{10}$—$C_{11}$—$C_{13}$—$C_{14}$—$C_{15}$ and resistors $R_{11}$—$R_{12}$—$_{13}$—$R_{14}$—$R_{15}$—$R_{16}$—$R_{17}$, serves as an all-wave oscillator and frequency mixer. Thus the combination of the circuits built around $T_3$ and $T_4$ provide a carrier frequency of one desired value modulated by a second frequency periodically varying over a preassigned range.

In other words, the mean frequency of the frequency modulated wave obtained from $T_3$ may be converted to any desired different mean frequency by heterodyning the frequency modulated wave with a carrier wave generated in oscillator $T_4$. Oscillator $T_3$ is essentially a fixed tuned oscillator arranged for frequency modulation. Oscillator $T_4$ is essentially a variably tuned oscillator arranged for amplitude modulation. By mixing the two waves in $T_4$ which functions as detector as well as amplifier, the variable frequency band may be shifted to a different point in the complete spectrum. The advantages of using two oscillators in this manner, instead of directly changing the tuning of the first oscillator, are that with our system, a tremendous range is available, the shift being either upward or downward, and the shift in mean frequency is obtained without accompanying change of band width.

At the terminals D will be found the carrier and its sidebands. Attenuation of these latter to the desired value is accomplished by the modulator grid potentiometer $R_{10}$ and voltage divider $R_6$. To these terminals are connected the input of the apparatus under test. The output of such apparatus under radio-frequency test is fed into terminals 1—2 if it has its own rectifier; otherwise into 2—4 with 1—3 shorted. The valve $T_5$, (type "75" say), serves as a diode rectifier and audio amplifier; and the output of same is made to control the vertical sweep of the electron beam in the cathode ray tube $T_6$.

It will be understood that because of the limited range of responsiveness of the circuit undergoing test, only one band of the energy at D is effective or need be used for test, the carrier and other bands departing too far to be effective. The frequency of oscillator $T_4$ is, of course, selected or adjusted with this in mind.

Due to hysteresis effects resulting from the periodically varying saturating currents supplied to $P_{21}$, or wherever the modulator frequency wave form is assymetric, the curves traced out by the cathode ray tube in the forward and reverse sweeps of the electron beam will differ. This undesirable condition is avoided by blocking out one of the traces via an additional grid in the cathode ray tube $T_6$ connected to the secondary $S_{24}$.

In other words, the cathode ray is occulted during the quick or return sweep. The preferably saw tooth modulating wave is itself used to occult the ray. Secondary coil $S_{24}$ develops the desired negative or occulting potential during the return sweep, and then the rate of change of the modulating current is a maximum.

In order to synchronize sweep of cathode ray beam with incremental frequency, note that the potential taken off $C_{23}$ is in phase with the saturating current employed.

To insure constant output at D for various frequency ranges, the microammeter M and its associated switch is provided. For each such setting, suitable adjustments are made with $R_8$ and $R_{14}$ until the meter reads the same on one side as on the other.

Frequency stabilization of the frequency modulated oscillator is attained by the series-resonance circuit comprising the lower half of $S_{23}$ and condenser $C_8$; and with this circuit, variations in plate impedance have substantially no effect on the phase angle of the voltage fed to the grid of $T_3$.

It will be understood that because the inductance of the lower coil of $S_{23}$ is varied at the same time as the inductance of the upper coil, the stabilization of the oscillator is maintained over the entire frequency modulation range. In other words, the tuning or reactance of the parallel and series resonant circuits being varied together, the series circuit is held at zero reactance throughout the range of the frequency modulation.

The secondary $S_{16}$ is used to provide filament current for the valves $T_3$—$T_4$—$T_5$.

Numerous modifications will readily suggest themselves to those skilled in the art without departing from the spirit and scope of this invention. We are for instance aware that the coupling between band modulator and carrier frequency generator need not be inductive; that resistance coupling need not be employed for the output of $T_5$; that the filter circuits shown may assume a variety of forms; and that the adjustments auxiliary to the indicator M may be coordinated and made automatic; and that the exact nature and number of the electron valves shown may be varied.

Also that various means may be used to generate the modulating wave; that the modulating wave need not be an approximately saw tooth wave; that various means may be used to frequency modulate the oscillator $T_3$; that various means may be used to modulate the output of oscillator $T_4$ with the output of oscillator $T_3$; that it is not essential to use two oscillators, especially for limited test range; that the amplifier rectifier tube $T_5$ is not essential, though desirable; that various means to occult the cathode ray may be used; and that occultation is not essential, though desirable.

In the specification and in the appended claims, the term "frequency response curve" refers broadly to any frequency response characteristic which may be flat or peaked, as well as curved. The terms "circuit to be tested" or "test circuit" include an electrical element or a distributed line, as well as a conventional resonance circuit, or in other words, we refer to anything which it may be desirable to test for frequency response.

Having now set forth the object and nature of our invention, and described instrumentalities embodying the principles thereof, and illustrated the method pertaining thereto, what we claim as new and useful and of our own invention and desire to secure by Letters Patent is:

1. Apparatus devoid of motor-driven or like mechanically moving mechanism for obtaining the frequency response of a circuit, said apparatus comprising an oscillator including a tuned circuit, a source of modulating current, mechanically static frequency modulation means for said oscillator arranged to be coupled to said source, means for applying the resulting frequency modulated energy to the circuit to be tested, means responsive to the output of the test circuit to produce physical motion in one direction, and means responsive to the modulating current source to produce physical motion in a different coordinate direction in order to plot the desired frequency response characteristic.

2. Apparatus for obtaining the frequency response of a circuit, said apparatus comprising means arranged for connection to an alternating current power line for producing an approximate saw-tooth wave, an oscillator including a tuned circuit having an inductance coupled to an iron core, a coil for applying the aforesaid saw-tooth wave to the iron core in order to vary the saturation thereof so as to vary the frequency of the oscillator, means for applying the frequency modulated energy to the circuit to be tested, means responsive to the output of the test circuit to produce physical motion in one direction, and means responsive to the saw-tooth wave to produce physical motion in a different coordinate direction in order to plot the desired frequency response characteristic.

3. Apparatus for obtaining the frequency response of a circuit, said apparatus comprising a power transformer for connection to an alternating current power line, a rectifier connected thereto, a condenser and associated load resistor connected to said rectifier for producing an approximate saw-tooth wave, an oscillator coupled to an iron core, a coil for applying the aforesaid saw-tooth wave to the iron core in order to vary the saturation thereof, means for applying the resulting modulated energy to the circuit to be tested, and means responsive to the output of the test circuit to produce physical motion in one direction and means responsive to the saw-tooth wave to produce physical motion in a different coordinate direction, in order to plot the desired frequency response characteristic.

4. Apparatus for obtaining the frequency response of a circuit, said apparatus comprising means arranged for connection to an alternating current power line for producing an approximate saw-tooth wave, an oscillator including a tuned input circuit and an output circuit having an inductance and condenser in series and resonant to the frequency of the input circuit in order to stabilize the oscillator, said inductance being coupled to the inductance of the input circuit and both being coupled to an iron core, a coil for applying the aforesaid saw-tooth wave to the iron core in order to vary the saturation thereof so as to vary the frequency of the oscillator, means for applying the frequency modulated energy to the circuit to be tested, means responsive to the output of the test circuit to produce physical motion in one direction, and means responsive to the saw-tooth wave to produce physical motion in a different coordinate direction in order to plot the desired frequency response characteristic.

5. An apparatus for determining frequency phenomena in an electric circuit to be tested, comprising means for generating a first frequency wave, means for generating a second frequency wave, means for frequency modulating said second frequency wave by said first frequency wave, means for generating a third frequency wave, means for amplitude modulating said third frequency wave by said frequency modulated wave, output terminal means adapted to feed the wave resulting from said successive modulations into an electric circuit to be tested, input terminal means adapted to receive current from a circuit to be tested, and means connected across said input terminal means for determining the frequency characteristics of said circuit.

6. An apparatus for continuous visual projection of the frequency response of a circuit, said apparatus comprising means for generating a first frequency wave, means for generating a second frequency wave, means for frequency modulation of said second by said first frequency wave, a variably tunable oscillator for generating a third frequency wave, means for amplitude modulating said third frequency wave by said frequency modulated wave, means for predetermining the band width of frequency variation, adjustable means associated with said oscillator for determining the frequency of the third wave in order to thereby determine the frequency spectrum location of the band, without resulting in any change in width of said band, output terminal means adapted to feed the wave resulting from said successive modulations into an electric circuit to be tested, input terminal means adapted to receive current from a circuit to be tested, and means including an oscilloscope connected across said input terminal means for visualizing the frequency characteristics of said circuit.

7. An apparatus for obtaining frequency modulated waves for visualization, comprising means for generating a substantially constant frequency first alternating current of predetermined frequency, means for generating a second alternating current of predetermined frequency, means for frequency modulating said second current substantially in accordance with the wave form and amplitude of said first current, and a cathode ray tube having two deflecting means to deflect an electrical beam in two different planes, one of said deflecting means being connected in circuit with said first alternating current and being responsive to electrical changes in said first alternating current.

8. Apparatus for obtaining the frequency response of a circuit, said apparatus comprising means for producing an approximate saw-tooth wave, an oscillator, frequency modulation means for applying the aforesaid saw-tooth wave to the oscillator in order to vary the frequency of the oscillator, means for applying the modulated energy to the circuit to be tested, a cathode ray tube having deflection means, means to apply the output of the test circuit to the vertical deflection means, and means to apply the sawtooth wave to the horizontal deflection means.

9. Apparatus for obtaining the frequency response of a circuit, said apparatus comprising a source of a modulating wave, an oscillator including a tuned circuit having an inductance coupled to an iron core, a coil for applying the aforesaid modulating wave to the iron core in order to vary the saturation thereof so as to vary the frequency of the oscillator, means for applying the frequency modulated energy to the circuit to be tested, a cathode ray tube and deflection means therefor, means to apply the output of the test circuit to the vertical deflection means, and means to apply the modulating wave to the horizontal deflection means.

10. Apparatus for obtaining the frequency response of a circuit, said apparatus comprising means for producing a modulating wave, an oscillator, means responsive to the aforesaid modulating wave to vary the frequency of the oscillator, means for applying the frequency modulated energy to the circuit to be tested, a cathode ray tube and deflection means therefor, means to apply the output of the test circuit to the vertical deflection means, means to apply the modulating wave to the horizontal deflection means, and means responsive to the modulating wave to occult the cathode ray during its return sweep.

11. Apparatus for obtaining the frequency response curve of a circuit, said apparatus comprising means for producing an approximate saw-tooth wave, an oscillator, means for applying the aforesaid saw-tooth wave to vary the frequency of said oscillator, means for applying the resultant modulated energy to the circuit to be tested, an amplifier tube, means to apply the output of the test circuit to the amplifier tube, optionally useable means to provide rectification in said amplifier tube, a cathode ray tube and deflection means therefor, means to apply the output of the amplifier to the vertical deflection means, and means to apply the saw-tooth wave to the horizontal deflection means.

12. Apparatus for obtaining the frequency response of a circuit, said apparatus comprising means for producing a modulating wave, a first oscillator, frequency modulating means responsive to said modulating wave for varying the frequency of the oscillator, a second oscillator, means to vary the frequency thereof, means to amplitude modulate the second oscillator in accordance with the frequency modulated output of the first oscillator, means for applying the resultant modulated energy to the circuit to be tested, a cathode ray tube and deflection means therefor, means to apply the output of the test circuit to the vertical deflection means, means to apply the modulating wave to the horizontal deflection means, and means responsive to the modulating wave to occult the cathode ray during its return sweep.

13. Apparatus for obtaining the frequency response curve of a circuit, said apparatus comprising a source of modulating wave, an oscillator including a tuned circuit having an inductance coupled to an iron core, a coil for applying the aforesaid modulating wave to the iron core in order to vary the saturation thereof so as to vary the frequency of the oscillator, means for applying the modulated energy to the circuit to be tested, a cathode ray tube and deflection means therefor, means to apply the output of the test circuit to the vertical deflection means, means to apply the modulating wave to the horizontal deflection means, and means to occult the cathode ray during its return sweep, said means comprising a coil coupled to the frequency modulating core and connected to a grid in the cathode ray tube.

14. In a method for obtaining a frequency modulated wave for visualization, the steps of generating a first alternating current of substantially constant predetermined frequency, generating a second alternating current of predetermined frequency, frequency modulating said second current substantially in accordance with the wave form and amplitude of the first current, generating a stream of electrons, and deflecting said stream in two different directions in synchronism with variations in said first alternating current.

15. In a method for obtaining a frequency response curve of a circuit for visualization, the steps of generating a first alternating current of substantially constant predetermined frequency, generating a second alternating current of predetermined frequency, frequency modulating said second current by said first, generating a third alternating current of predetermined frequency, amplitude modulating said third current by the alternating current resulting from said frequency modulation of said second current by said first, feeding the resulting current to the circuit to be tested, transforming electrical variations of said resultant output current of said test circuit into physical motion in one direction, and at the same time transforming the first alternating current into physical motion in a different coordinate direction in order to plot the desired frequency response curve.

16. In the testing of wave-responsive apparatus, the method which includes first generating a frequency modulated wave at any desired part of the frequency spectrum, the band or frequency range of variation of which is substantially constant over all parts of the frequency spectrum, by the steps of frequency modulating a constant frequency carrier, thereafter amplitude modulating another constant frequency carrier by means of the frequency modulated carrier, determining the location in the frequency spectrum of the variable frequency band by adjustment of the circuit characteristics of the circuit generating the second constant frequency carrier, without changing the circuit characteristics of the circuit generating the first and second frequency carrier, causing the apparatus to be tested to respond to one of the side bands of the last-named modulation, and feeding the output of the tested apparatus to a cathode ray tube arranged to project the frequency response curve of the test circuit on the screen of the cathode ray tube as a stationary image.

17. In the testing of wave-responsive apparatus, the method which includes first frequency modulating a constant frequency carrier, attenuating the frequency modulated carrier to desired value, thereafter amplitude modulating another constant frequency carrier by means of the attenuated frequency modulated carrier, and causing the apparatus to be tested to respond to one of the side bands of the last-named modulation.

18. In a method for obtaining a frequency modulated wave for visualization of the frequency response of a circuit to be analyzed, the steps of generating a first alternating current of substantially constant predetermined frequency, generating a second alternating current of predetermined frequency, frequency modulating said second current by said first, generating a third alternating current of predetermined frequency, amplitude modulating said third current by the alternating current resulting from said frequency modulation of said second current by said first, feeding a side band of the resulting modulated wave to the circuit to be analyzed, generating a stream of electrons, and deflecting said stream by components in two directions, one component being obtained in response to the output of the circuit to be analyzed, and the other component being obtained in response to the aforesaid first frequency wave.

19. An apparatus devoid of motor-driven or like mechanically moving mechanism for continuous visual projection of the frequency response curve of a circuit to be tested comprising means for generating wave energy of a first frequency, means for generating wave energy of a second frequency, mechanically-static frequency modulating means for modulating the energy of the second frequency by the energy of the first frequency, a variably tunable oscillator for generating wave energy of a third predetermined frequency, means for amplitude-modulating said third frequency energy by said frequency modulated energy, output terminal means adapted to feed the wave energy resulting from said successive modulations into the circuit to be tested, input terminal means adapted to receive current from the circuit to be tested, and means including an oscilloscope connected across said input terminal means for visualizing the frequency characteristic of said circuit.

20. Apparatus devoid of mechanically driven mechanism for continuous visual projection of a frequency response curve of a circuit to be tested, said apparatus comprising means responsive to an alternating current power supply source for producing energy whose time variation is of substantially triangular wave shape and constant frequency and in direct timed relation therewith, an oscillator, mechanically-static frequency modulation means for modulating the frequency of the oscillator under the control of said energy, means for applying frequency-modulated energy from said oscillator to the circuit to be tested, a cathode ray tube having beam forming means and a target, two mutually perpendicular deflection means for controlling the position of impact of the beam on the target, means to apply energy representative of output energy of the test circuit to one of the deflection means, and means to apply triangular wave shape energy to the other of the deflecting means, the frequency of said triangular wave shape energy having a factor common with the frequency of the alternating current power supply whereby a stationary image is produced on the target of the cathode ray tube.

21. Apparatus devoid of mechanically driven mechanism for continuous visual projection of a frequency response curve of a circuit to be tested, said apparatus comprising means responsive to an alternating current power supply source for producing energy whose time variation is of substantially triangular wave shape and in direct timed relation therewith, an oscillator, mechanically-static frequency-modulation means for modulating the frequency of the oscillator under the control of said energy, means for applying frequency modulated energy from said oscillator to the circuit to be tested, a cathode ray tube having beam forming means and a target, two mutually perpendicular deflection means for controlling the position of impact of the beam on the target, an amplifier tube, means to supply output energy of the test circuit to said amplifier tube, optionally usable means to provide rectification in said amplifier tube, means to apply energy representative of output energy of amplifier tube to one of the deflection means, and means to apply triangular wave shape energy to the other of the deflecting means, the frequency of said triangular wave shape energy having a factor common with the frequency of the alternating current power supply whereby a stationary image is produced on the target of the cathode ray tube.

22. Apparatus devoid of mechanically driven mechanism for continuous visual projection of a frequency response curve of a circuit to be tested, said apparatus comprising means responsive to an alternating current power supply source for producing energy whose time variation is of substantially triangular wave shape and in direct timed relation therewith, a first oscillator, mechanically-static frequency-modulation means for modulating the frequency of the oscillator under the control of said energy, a second oscillator, means to amplitude-modulate energy of the second oscillator in accordance with said frequency-modulated energy, means for applying the modulated energy from said second oscillator to the circuit to be tested, a cathode ray tube having beam forming means and a target, two mutually perpendicular deflection means for controlling the position of impact of the beam on the target, means to apply energy representative of output energy of the test circuit to one of the deflection means, means to apply triangular wave shape energy to the other of the deflecting means, the frequency of said triangular wave shape energy having a factor common with the frequency of the alternating current power supply, whereby a stationary image is produced on the target of the cathode ray tube and control means to adjust the frequency of said second oscillator to a predetermined frequency.

23. An apparatus devoid of mechanically driven mechanism for continuously projecting the frequency response of a circuit to be tested for visualization, said apparatus comprising means responsive to an alternating current power supply for generating a substantially constant frequency current of triangular wave shape and in timed relation to the alternating current power supply, means for generating an alternating current of higher frequency than said constant frequency, means for frequency modulating said higher frequency current substantially in accordance with the wave form and amplitude of said constant frequency current, means to supply the frequency modulated current to the circuit to be tested, and a cathode ray tube having a screen and two deflecting means to deflect an electrical beam in two different planes, one of said deflecting means being energized in timed relation to the alternating power supply, and the other deflecting means being responsive to the frequency modulated current from the circuit being tested, whereby the two deflecting means are energized in timed relation to the alternating current power supply to produce a stationary image on the screen of the cathode ray tube.

24. An apparatus devoid of mechanically driven mechanism for continuously projecting the frequency response of a circuit to be tested for visualization, said apparatus comprising an alternating current power supply, means for generating energy whose time variation is of substantially triangular wave form of a predetermined frequency and in timed relation to the alternating current power supply, a local oscillator for generating an alternating current of higher frequency than said predetermined frequency, means for frequency modulating said higher frequency current substantially in accordance with the wave form and amplitude of energy from the triangular wave generating means, means to supply the frequency-modulated current to the circuit to be tested, and a cathode ray tube having a target to receive a beam of electrons and two deflecting means to deflect said electron beam in two different planes, means to energize one of said deflecting means in response to energy from the triangular wave generating apparatus, and means to energize the other of the deflecting means in accordance with the frequency-modulated current from the circuit being tested, whereby the two deflecting means are energized in timed relation to the alternating current power supply to produce a stationary image on the target of the cathode ray tube.

25. In a method for continuously projecting the frequency response curve of a circuit to be tested for visualization free from motor-driven or like mechanically moving mechanism, the steps of generating energy whose time variation is of substantially triangular wave shape from an alternating current power supply and in timed relation therewith, generating an alternating current of higher frequency than that of said energy, frequency-modulating said higher frequency current substantially in accordance with the wave form and amplitude of the triangular wave shape energy, applying the frequency modulated current to the circuit to be tested, generating a stream of electrons in a cathode ray tube having a target impacted by the generated stream, and deflecting said stream in two different directions, the deflection in one direction being in timed relation with the alternating current power supply and the deflection in the other direction being in response to the circuit being tested, whereby a stationary response curve is produced on the target.

26. In a method for continuously projecting the frequency response curve of a circuit to be tested for visualization free from mechanically moving mechanism, the steps of generating energy whose time variation is of substantially triangular wave form from an alternating current power supply and in timed relation therewith, generating an alternating current of higher frequency than that of said energy, frequency modulating said higher frequency current substantially in accordance with the wave form and amplitude of said triangular wave energy, applying the resulting frequency-modulated current to the circuit to be tested, generating a stream of electrons, and deflecting said stream in one direction in response to energy of triangular wave form, deflecting said stream in another direction in response to frequency-modulated current from the circuit being tested, and producing a stationary visible trace by the doubly deflected stream of electrons.

27. In a method for continuously projecting the frequency response curve of a circuit to be tested for visualization free from mechanically moving mechanism, the steps of generating energy whose time variation is of substantially triangular wave form from an alternating current power supply and in timed relation therewith, generating an alternating current of higher frequency than said energy, frequency-modulating said higher frequency current substantially in accordance with the wave form and amplitude of the aforesaid triangular wave energy, applying the resulting frequency-modulated current to the circuit to be tested, generating a stream of electrons in a cathode ray tube, impacting the stream on a target area, deflecting said stream on one coordinate axis in response to triangular wave energy, deflecting said stream on an axis transverse to said coordinate axis in response to frequency-modulated current from the circuit being tested, the sweep time in one direction and the modulation swing in one direction both corresponding to the time interval of change of the triangular wave energy in one direction, whereby the deflection on both axes produces a stationary image on the target area.

28. Apparatus for continuous visual projection of the frequency response of a circuit, said apparatus comprising a power transformer for connection to an alternating current power line, a rectifier, a condenser and associated load resistor connected to said rectifier for producing energy whose time variation is of substantially triangular wave shape, an oscillator, means for applying the aforesaid energy to vary the frequency of the oscillator by modulation, means to apply modulated energy from the oscillator to a circuit to be tested, a cathode ray tube having vertical and horizontal deflection means, means to apply the output of the test circuit to the vertical deflection means, and means to apply the first named energy to the horizontal deflection means.

29. Apparatus for continuous visual projection of the frequency responsive curve of a circuit, said apparatus comprising a power transformer for connection to an alternating current power line, a rectifier connected thereto, means connected to said rectifier for producing energy whose time variation is of substantially triangular wave shape, a first oscillator, frequency modulation means for applying the aforesaid energy to the oscillator in order to vary the frequency of the oscillator, a second oscillator, means to amplitude modulate the second oscillator in accordance with the frequency modulated output of the first oscillator, means for applying the resultant modulated energy to a circuit to be tested, adjustable means to vary the frequency of the second oscillator in order to determine the approximate test frequency applied to the circuit, a cathode ray tube having vertical and horizontal deflection means therefor, means to apply the output energy of the test circuit to the vertical deflection means, and means to apply the first named energy to the horizontal deflection means.

SAMUEL BAGNO.
MARTIN POSNER.